Fig.1.

April 12, 1932.   D. J. BARNARD   1,853,250
GRAB
Filed June 22, 1931   7 Sheets-Sheet 2

INVENTOR
Dudley James Barnard
BY
ATTORNEY

April 12, 1932.  D. J. BARNARD  1,853,250

GRAB

Filed June 22, 1931  7 Sheets-Sheet 4

INVENTOR
Dudley James Barnard
BY
ATTORNEY

Patented Apr. 12, 1932

1,853,250

UNITED STATES PATENT OFFICE

DUDLEY JAMES BARNARD, OF BARKING, ENGLAND

GRAB

Application filed June 22, 1931, Serial No. 546,002, and in Great Britain June 25, 1930.

This invention relates to grabs of the type known as single rope ring discharge grabs and it has for its object a construction which will enable greater digging powers to be employed without the necessity for increasing the strength and weight of the parts designed for maintaining the grab in its open position.

The grab forming the subject of this invention is of known form in so far as it is composed of two bucket sections pivoted on independent pivot pins on a transverse crossbeam with spreader arms at each outer corner of the bucket sections, the upper ends of said arms being pivoted on independent pivot pins secured in block plates which constitute the head of the grab.

This invention resides more particularly in the provision of means for maintaining the bucket sections in the open position when the grab is being released from the tipping ring and for taking the stresses tending to close the same, comprising one or more vertically disposed rods carried by a part pivotally mounted on the head of the grab and arranged to coact with means carried by the cross-beam.

In the accompanying drawings which illustrate this invention:—

Referring to Figures 1 to 9 of the drawings which illustrate one embodiment of the invention, the main body of the grab is of known form in that it is composed of two bucket sections 20, 21, pivoted on independent pivot pins 22 on a transverse cross-beam 23 with spreader arms 24 pivoted at 25 to each outer corner of the bucket sections, the upper ends of said arms being pivoted on independent pivot pins 26 secured in block plates 27 which constitute the head of the grab; 28 is the tipping ring suspended from the jib of the crane and 29 the hauling rope or chain, hereinafter referred to as the hauling rope, arranged to pass through the ring 28 and the thimble 30 secured to the head of the grab, around the sheave 31, upwardly and over the sheave 32, downwardly and around the sheave 33, upwardly and over the sheave 34 and finally downwardly to the part 35 by means of which the free end is secured to the cross-beam 23.

The centre part of the head of the grab between the plates 27 (Figure 4) is built up of a series of plates to form a boxlike structure open top and bottom, divided internally to form two compartments disposed in parallel relation to the pivot pins 26 and in the lower part of which are pivoted the purchase sheaves 32 and 34, a third compartment being formed in the centre in which is secured the thimble 30, on the upper part of which the hook shaped elements 36 coacting with the tipping ring 28 are mounted. Slidably arranged within the thimble 30 is a sleeve 37 (see Figures 6 to 9) provided with two oppositely disposed vertically arranged slots 38 adapted to receive the horizontally disposed lower ends 39 of the elements 36; the lower end of the sleeve 37 is of rectangular form and fits between the plates 40 forming the compartment in which the thimble 30 is secured, the lower end being provided, one on either side, with extensions 41, the inner faces of which are cut at an angle and are arranged to coact with a narrow rectangular plate 42 supported by a stirrup shaped plate 43 secured to the plates 40 so as to have a limited rotative movement relatively thereto, a ball bearing 44 being preferably disposed between the stirrup plate 43 and the plate 42 to give greater freedom of movement. The plate 42 is provided on its upper face with a tubular member 45 adapted to enter and rotate in the lower part of the sleeve 37 and on its lower face, one at either end, with two bosses 46 in which are secured the upper ends of two downwardly extending rods 47.

The cross-beam 23 (Figure 5) to which the extreme ends of the bucket sections 20, 21, are pivoted, is built up of a series of plates to form a box-like structure open top and bottom divided internally to form a plurality of compartments in one of which 48, is pivotally mounted at 49, the purchase sheave 33, said sheave being disposed with its axis of rotation in parallel relation with the longitudinal axis of the cross-beam and at right angles to the axes of the sheaves 32 and 34 mounted in the head of the grab, so that the groove on both sides of said sheave is immediately beneath the grooves on one side of each of the sheaves 32 and 34. A second sheave 31 is located in the adjacent compartment 50, said sheave being mounted in a housing 51, pivoted at 52 in a bracket 53 secured to the plate 54. The other end of the housing 51 is arranged to slide freely in a vertically disposed guide 55 secured to the plate 56. As shown, the housing 51 is disposed at an angle to the longitudinal axis of the beam and is so arranged that the groove in the sheave adjacent the guide 55 is at the plane of its axis, in the vertical axis of the grab, that is, directly below the axis of the thimble 30 and the other side of the groove is in a direct line with the sheave 32.

Figure 1:
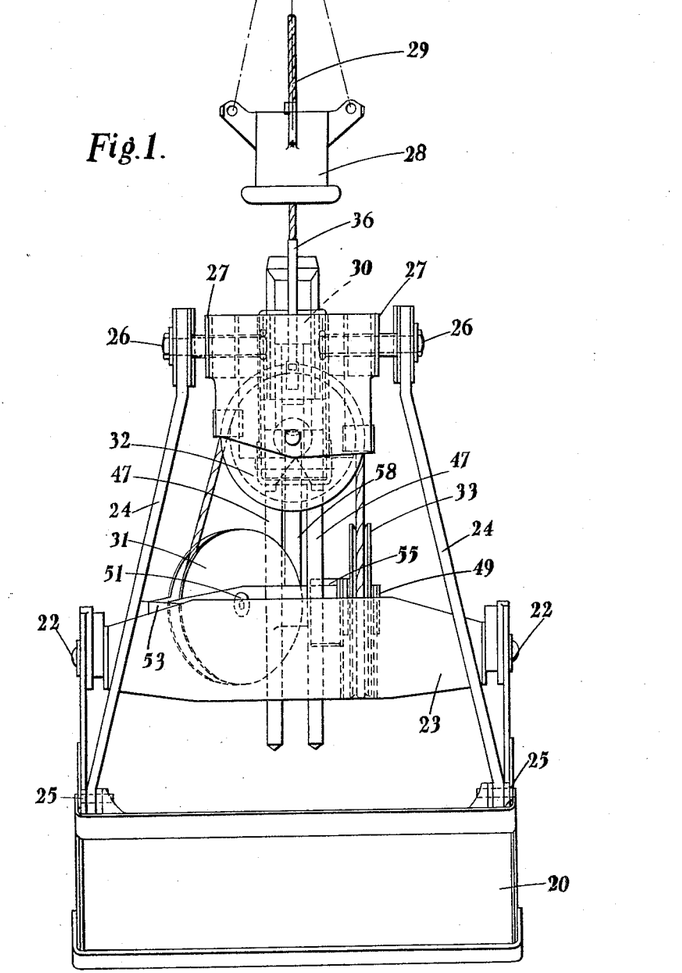
Figure 1 is a front elevation of the grab supported by the hauling rope with the bucket sections in the closed position.
Figures 2, 5:
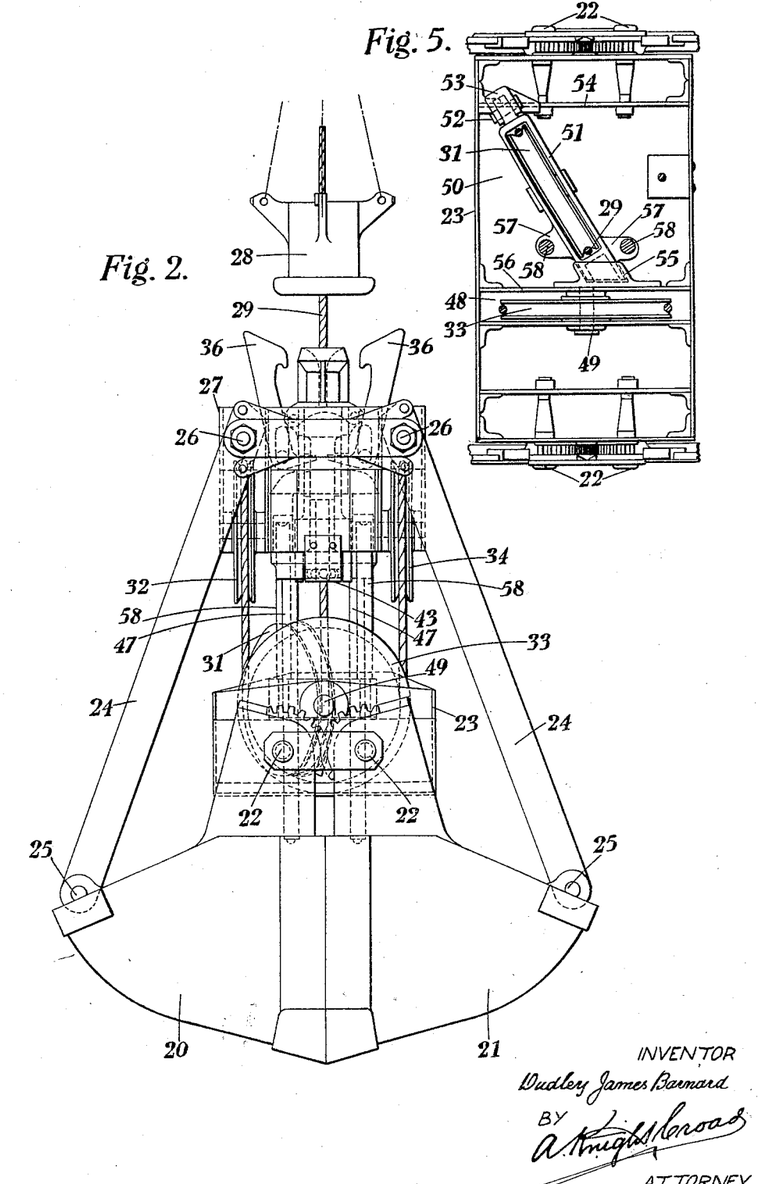
Figure 2 is a side elevation thereof.
Figure 5 is a plan of the cross-beam.
Figure 3:
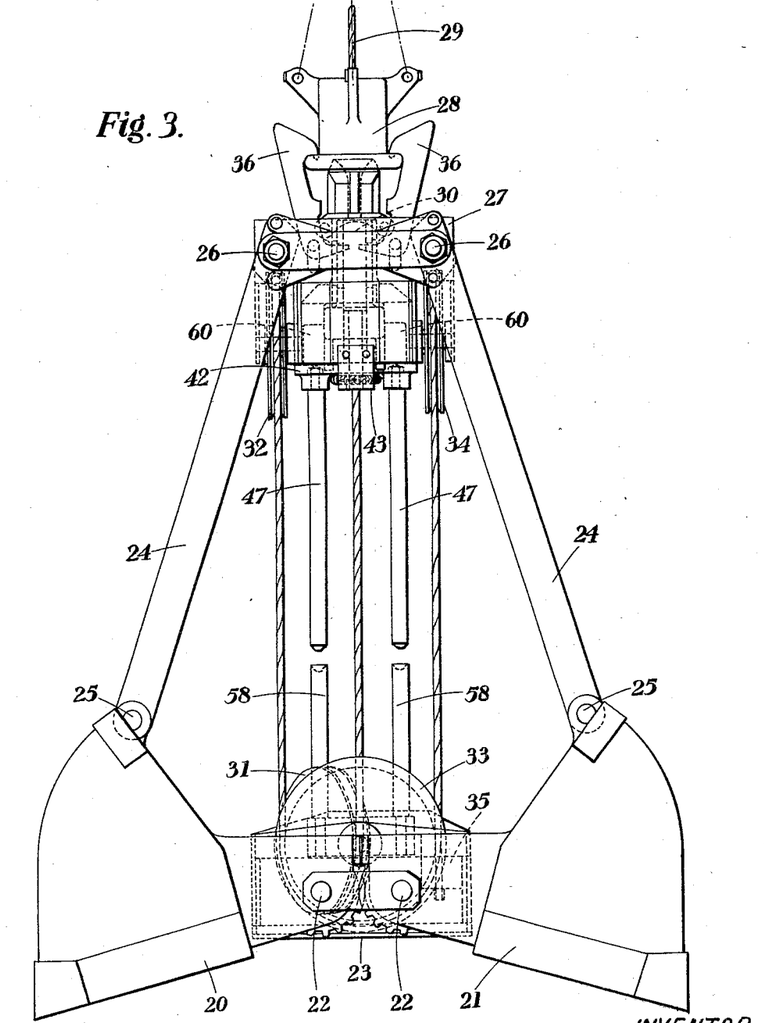
Figure 3 is a similar view to Figure 2 with the bucket sections in the open position, the grab being supported by the tipping ring.
Figure 4:
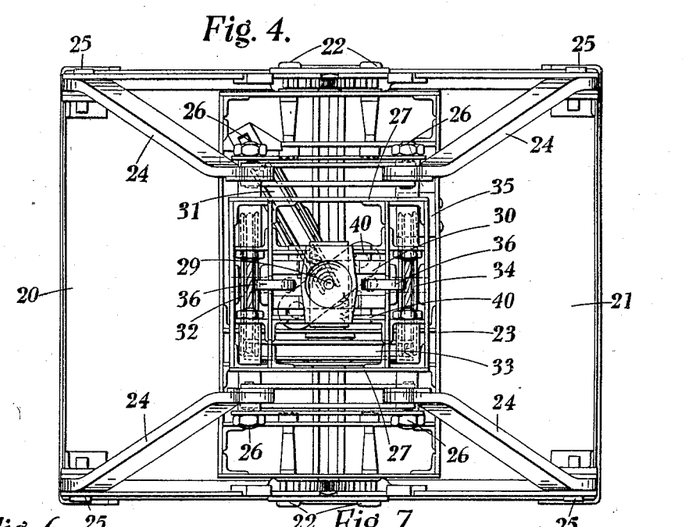
Figure 4 is a plan of the grab.

The housing 51 is furnished on its exterior, adjacent the guide 55, with two bosses 57 in which are secured the lower ends of two upwardly extending rods 58, slightly shorter than the rods 47, the arrangement being such that when the grab is open and when being supported by the ring, the rods 47 are coaxially disposed with relation to the rods 58 (Figure 3). The free ends of the rods are adapted to butt against each other and in order to maintain the respective rods in alignment the free ends of the rods 58 are recessed and the free ends of the rods 47 are formed so as to seat in said recesses.

Figure 6:
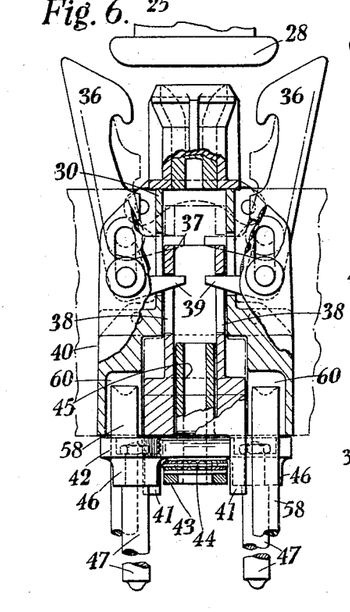
Figure 6 is a side elevation, partly in section, of part of the head of the grab.
Figures 7, 8, 9:
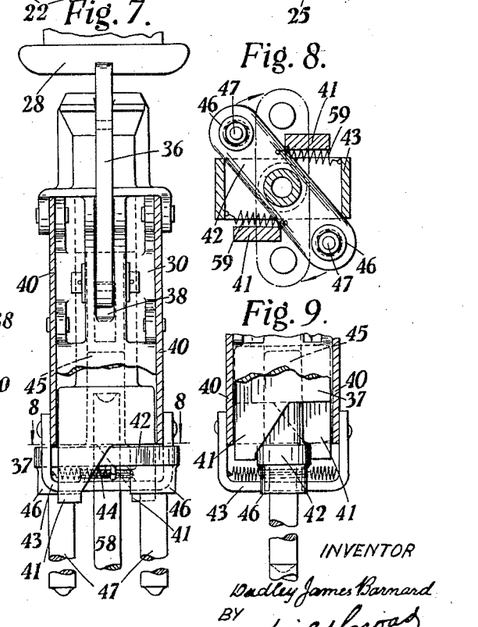
Figure 7 is a front elevation, partly in section, thereof.
Figure 8 is a section on line 8—8 of Figure 7.
Figure 9 is a front elevation of the lower part of Figure 7 showing the parts in a different position.
Figure 10:
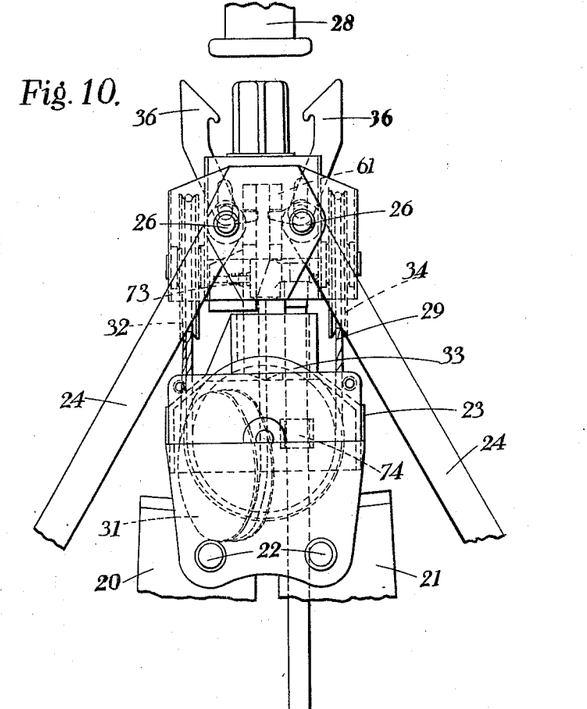
Figure 10 is a side elevation of the upper part of a grab, with parts in the closed position, showing a modified form of the means for retaining the bucket sections in the open position.

In operation, assuming the grab to be open and supported on the ring as shown in Figure 3, the hauling rope 29 being slack, there is a small gap between the ends of the rods 47 and 58, when the hauling rope 29 is drawn in, the housing 51 is drawn upwardly and in rising brings the rods 58 into engagement with the rods 47 and these rods take, in a vertical direction, the stresses tending to close the bucket sections, thereby maintaining same in the open position. Further drawing in of the hauling rope raises the entire grab, and the elements 36 are free to fall outwardly by reason of the fact that the weight of the sleeve 37 is removed from the ends 39, said sleeve being maintained in its upper position by the engagement of the angularly faced extensions 41 bearing against the plate 42 (Figure 9). When the grab is lowered onto the ground or material to be raised, and the hauling rope paid out slightly, the housing 51 is free to drop and causes the disengagement of the rods 47 and 58; immediately this takes place the sleeve 37, which is of considerable weight, which may be increased by the provision of a suitable spring, falls into its lowermost position and the extensions 41 bearing against the plate 42, turn said plate on its bearings against the action of suitably disposed springs 59 (Figure 8). The axes of the rods 47 and 58 now being out of coincidence, if the hauling rope 29 is now hauled in, the grab may be closed; the lower ends of the rods 47 pass through the cross-beam and the upper ends of the rods 58 pass into recesses 60 provided in the lower part of the thimble 30 (Figure 6).

In the embodiment of the invention illustrated in Figures 10 to 15, the number of moving parts of the grab is reduced, thereby reducing the weight of the grab; in this construction the sleeve 37 is replaced by a sliding block 61 which is furnished with the oppositely disposed slots 38 and acts in a similar manner to said sleeve. The lower end of the block 61 is cut away as shown at 62 (Figure 13) and coacts with an arm 63 pivoted at 64 in lugs 65 provided on the plate 65ˣ. The arm 63 is provided with a socket 66 in which is secured the upper end of a downwardly directed rod 67, the lower end of which is arranged to coact with a socket 68 carried by the cross-beam 23. The main parts of the cross-beam are substantially the same as above described with reference to Figures 1 to 9, but in this embodiment the housing 69 is immovably secured to the cross-beam and the socket 68 is carried by a transversely disposed member 70, said member being located approximately in the vertical centre of the grab. The socket is furnished with an aperture 71 through which the rod 67 is adapted to pass during the closing movement of the bucket sections. The socket 68 is further provided with an aperture 72 through which the hauling rope 29 is adapted to pass to the sheave 31.

Figures 11, 12, 13:
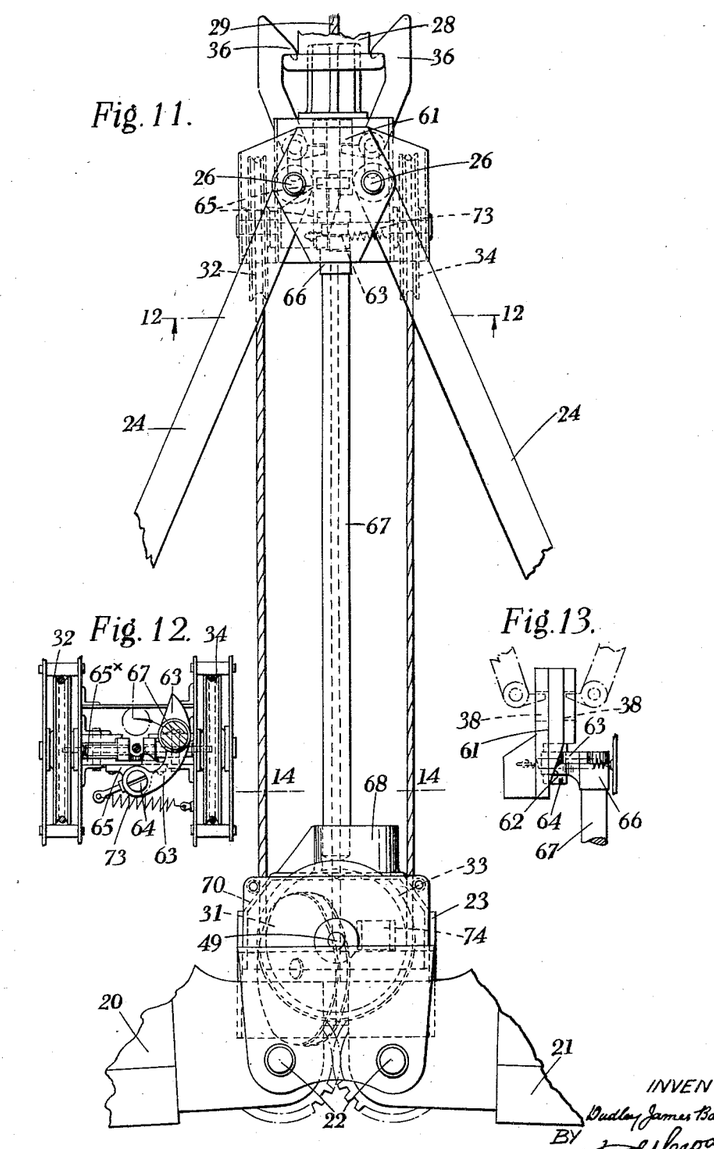
Figure 11 is a similar view with the parts in the open position.
Figure 12 is a transverse section on line 12—12 of Figure 11.
Figure 13 illustrates a detail of construction.
Figure 14:
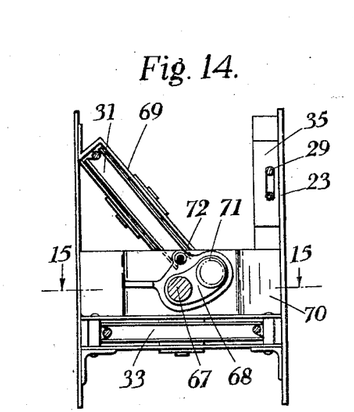
Figure 14 is a transverse section on line 14—14 of Figure 11.
Figure 15:
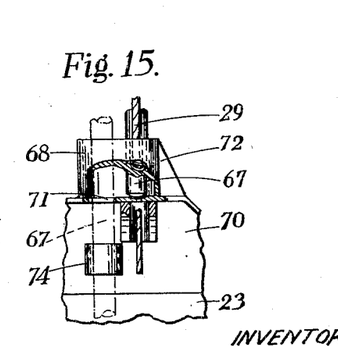
Figure 15 is a sectional side elevation on line 15—15 of Figure 14.
Figure 16:
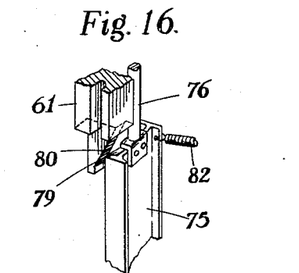
Figure 16 is a perspective view of a detail of construction.
Figure 17:
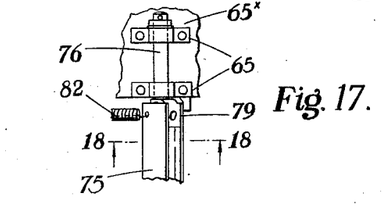
Figure 17 is a side elevation of part of the mechanism shown in Figure 18 as viewed from the line 17—17.
Figure 18:
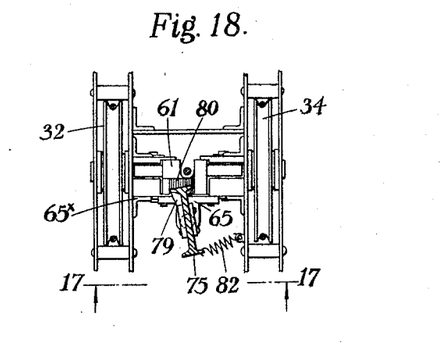
Figure 18 is a transverse section of part of the head of the grab on line 18—18 of Figure 17 of a modified form of the means for retaining the bucket sections in the open position.
Figure 19:
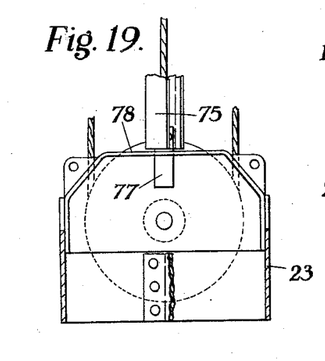
Figure 19 is a sectional elevation on line 19—19 of Figure 20.
Figure 20:
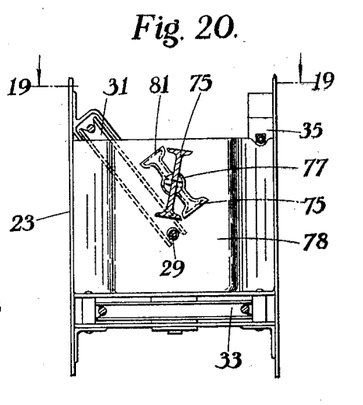
Figure 20 is a plan of Figure 19.

In operation, assuming the grab to be open and supported by the ring 28 as shown in Figure 11, the hauling rope being slack, the lower end of the rod 67 is out of coincidence with the aperture 71 (Figure 14). When the hauling rope is drawn in the cross-beam is drawn up slightly until the end of the rod 67 bears against the bottom of the socket 68 thereby preventing the closing of the bucket sections. Further drawing in of the hauling rope raises the entire grab and as in the previous embodiment the elements 36 fall outwardly from the ring. The grab may now be lowered on to the ground or material to be raised and when the hauling rope is slackened the arm 63 is turned on its pivot 64 by a spring 73 thereby bringing the lower end of said rod into coincidence with the aperture 71 in the socket 68; if now the hauling rope is hauled in the grab may be closed, the rod 67 passing through the aperture 71 and guide tube 74 as shown by broken lines in Figure 15.

In order to still further simplify the construction of the grab, reduce the number of parts and thereby the weight, and to render the operation of certain parts more certain, particularly when the grab is disposed at an angle on a heap of material to be raised, the means for maintaining the bucket sections in the open position may be modified as shown in Figures 16 to 20, according to which the depending rod 75 is of H or I section in cross-section and is furnished at its upper end with a trunnion 76 rotatably mounted in the lugs 65 on the plate 65ˣ, and at its lower end with a trunnion 77 rotatably mounted in a transversely arranged plate 78 secured to the cross-beam 23. The upper end of the rod 75 is furnished with a form of cam surface 79 preferably formed in one with the lower part of the trunnion 76 adapted to coact with the angularly formed face 80 on the sliding part 61 in a similar manner to that previously described.

The plate 78 is provided with an aperture 81 of the same shape but slightly larger than the rod 75, the position of said aperture being such that when the rod is turned in one position it coincides with said aperture and is free to slide therethrough.

In operation, assuming the bucket sections to be in the open position and the grab supported on the ring, the hauling rope being slack, the rod 75 is held by the spring 82 so that the lower end of said rod is out of coincidence with the aperture 81 in the plate 78 (Figure 20) and rests on said plate; when the grab is released from the ring and deposited on the ground in the manner previously described the rod 75 is turned on its pivot against the action of the spring by the falling of the sliding member 61 so as to bring said rod into coincidence with the aperture 81. If now the hauling rope is hauled in the grab may be closed, the rod 75 passing through the aperture 81.

What I claim is:—

1. In a grab of the single rope type having a cross-beam with pulleys mounted therein and in the head of the grab and a tipping ring, the combination of means comprising hook-shaped elements carried by the head of the grab adapted to coact with said tipping ring, means having a limited rotative movement mounted on the head of the grab, means carried by and depending from said rotative means and means carried by the cross-beam adapted to coact with the said depending means for maintaining the grab in the open position.

2. In a grab of the single rope type having a cross-beam with pulleys mounted therein and in the head of the grab and a tipping ring, the combination of means comprising hook-shaped elements carried by the head of the grab adapted to coact with said tipping ring, means mounted on the head of the grab comprising a plate having a limited rotative movement, two downwardly extending rods secured to the underside of said plate, means mounted on the cross-beam comprising two upwardly extending rods, means comprising a pair of springs for maintaining the downwardly and upwardly extending rods in axial alignment, and means slidably mounted in the head of the grab for effecting a partial rotative movement of the plate carrying the downwardly extending rods to move same out of coaxial alignment with the upwardly extending rods when it is desired to close the grab.

3. In a grab of the single rope type having a cross-beam with pulleys mounted therein and in the head of the grab and a tipping ring, the combination of means comprising hook-shaped elements carried by the head of the grab adapted to coact with said tipping ring, means comprising an arm pivoted on the head of the grab, a downwardly extending rod secured to one end of said arm, means mounted on the cross-beam comprising a socket carried by a transversely disposed member, means comprising a spring for maintaining the downwardly extending rod in axial alignment with said socket, a block slidably arranged in the head of the grab coacting with the hook-shaped elements, a cam surface formed on the lower end of said block adapted to coact with the pivoted arm for effecting a limited rotative movement of the arm to move the downwardly extending rod out of axial alignment with the socket when it is desired to close the grab.

4. In a grab of the single rope type having a cross-beam with pulleys mounted therein and in the head of the grab and a tipping ring, the combination of means comprising a pair of hook-shaped elements carried by the head of the grab adapted to coact with the tipping ring, lugs secured to the head of the grab, a horizontally disposed arm pivoted in said lugs, a downwardly extending rod secured to said arm, a block having a vertical sliding movement in said head, means on the cross-beam comprising a horizontally and transversely disposed plate, a socket carried by said plate, means comprising a spring for maintaining the downwardly extending rod in axial alignment with said socket, means on the lower end of the sliding block adapted when said part falls into its lowest position to bear against the pivoted arm so as to rotate same in its pivot and thereby move the downwardly extending rod out of coincidence with the socket on the cross-beam.

5. In a grab of the single rope type having a cross-beam with pulleys mounted therein and in the head of the grab and a tipping ring, the combination of means comprising a pair of hook-shaped elements carried by the head of the grab adapted to coact with the tipping ring, lugs secured to the head of the grab, a vertically disposed trunnion pivotally mounted in said lugs, a downwardly extending rod of H-section secured to said trunnion, a block having a vertical sliding movement in said head, means on the cross-beam comprising a horizontally and transversely disposed plate, an aperture formed in said plate corresponding in shape with the shape of the downwardly extending rod, means comprising a spring for maintaining the downwardly extending rod out of coincidence with said aperture, means on the lower end of the sliding block adapted when said part falls into its lowermost position to bear against the upper end of the downwardly extending arm so as to impart a limited rotative movement thereto and bring said rod into coincidence with the aperture in the plate carried by the cross-beam.

6. A grab of the single rope discharge type, comprising a cross-beam, a pair of bucket sections pivoted thereon, a box-like structure built up of a plurality of plates constituting the head of the grab, a plurality of sheaves mounted in the cross-beam and head of the grab, spreader arms connecting the cross-beam with the head of the grab, a thimble secured in the head of the grab, hook-shaped elements slidably and pivotally mounted in said thimble, a tipping ring with which said hook-shaped elements coact, a slidable element arranged in said thimble coacting with the lower ends of said hook-shaped elements, a rotatable element mounted on the head of the grab, a spring for controlling said rotatable element, means provided on the lower end of the slidable element adapted to turn said rotatable element against the action of the spring, means depending from and carried by said rotatable element and means carried by the cross-beam adapted to coact with the depending means carried by the rotatable element for maintaining the grab in the open position.

7. A grab of the single rope discharge type, comprising a cross-beam, a pair of bucket sections pivoted thereon, a box-like structure built up of a plurality of plates constituting the head of the grab, a plurality of sheaves mounted in the cross-beam and head of the grab, spreader arms connecting the cross-beam with the head of the grab, a thimble secured in the head of the grab, hook-shaped elements slidably and pivotally mounted in said thimble, a tipping ring with which said hook-shaped elements coact, a slidable element arranged in said thimble coacting with the lower ends of said hook-shaped elements, a rotatable element mounted on the underside of the head of the grab, cam surfaces provided on the lower end of the slidable element coacting with said rotatable element, means comprising a pair of downwardly extending rods carried by said rotatable element, means comprising a sheave housing pivotaly mounted on the cross-beam and means comprising a pair of upwardly extending rods carried by said housing adapted to coact with the downwardly extending rods to maintain the grab in the open position.

8. A grab of the single rope discharge type, comprising a cross-beam, a pair of bucket sections pivoted thereon, a box-like structure built up of a plurality of plates constituting the head of the grab, a plurality of sheaves mounted in the cross-beam and head of the grab, spreader arms connecting the cross-beam with the head of the grab, a thimble secured in the head of the grab, hook-shaped elements slidably and pivotally mounted in said thimble, a tipping ring with which said hook-shaped elements coact, a sleeve slidably arranged in said thimble coacting with the lower ends of said hook-shaped elements, extensions on the lower end of said sleeve, a rotatable element comprising a plate coacting with said extensions, a tubular member on the upper face of said plate adapted to enter and rotate in the lower end of the sleeve, a stirrup shaped element secured to the lower part of the head of the grab for supporting said rotatable element, a ball bearing located between said element and stirrup, cam surfaces provided on the extensions on the slidable sleeve coacting with said rotatable element, means comprising a pair of downwardly extending rods carried by said rotatable element, means comprising an angularly disposed sheave housing pivotally mounted in the cross-beam, bosses provided on said housing adjacent its free end, and means secured in said bosses comprising a pair of upwardly extending rods adapted, when the sliding sleeve is in its uppermost position, to coact with the downwardly extending rods carried by the rotatable element for maintaining the grab in the open position.

9. A grab of the single rope discharge type, comprising a cross-beam, a pair of bucket sections pivoted thereon, a box-like structure built up of a plurality of plates constituting the head of the grab, a plurality of sheaves mounted in the cross-beam and head of the grab, spreader arms connecting the cross-beam with the head of the grab, a thimble secured in the head of the grab, hook-shaped elements slidably and pivotally mounted in said thimble, a tipping ring with which said hook-shaped elements coact, an element comprising a block slidably arranged in said thimble coacting with the lower ends of said hook-shaped elements, a rotatable element mounted on the head of the grab comprising a spring controlled pivoted arms, means comprising a downwardly extending rod carried by said arm, a cam surface provided on the lower end of the slidable block adapted to coact with said spring controlled arm, means comprising a transverse plate secured to the cross-beam, a socket carried by said transverse plate with which the lower end of the downwardly extending rod is adapted to coact to maintain the grab in the open position.

10. A grab of the single rope discharge type, comprising a cross-beam, a pair of bucket sections pivoted thereon, a box-like structure built up of a plurality of plates constituting the head of the grab, a plurality of sheaves mounted in the cross-beam and head of the grab, spreader arms connecting the cross-beam with the head of the grab, a thimble secured in the head of the grab, hook-shaped elements slidably and pivotally mounted in said thimble, a tipping ring with which said hook-shaped elements coact, an element comprising a block slidably arranged in said thimble coacting with the lower ends of said hook-shaped elements, a rotatable element mounted on the head of the grab, comprising a spring controlled downwardly extending rod of H-section in cross-section, a cam surface provided on the upper end of said rod, a cam surface provided on the lower end of the slidable block coacting with the cam surface on the rotatable element, and means comprising a transverse plate secured to the cross-beam with which the lower end of the rotatable element is adapted to coact to maintain the grab in the open position.

DUDLEY JAMES BARNARD.